(12) United States Patent
Huang et al.

(10) Patent No.: US 10,382,778 B2
(45) Date of Patent: Aug. 13, 2019

(54) METHOD FOR MOTION VECTOR STORAGE IN VIDEO CODING AND APPARATUS THEREOF

(71) Applicants: Han Huang, San Jose, CA (US); Kai Zhang, Beijing (CN); Jicheng An, Beijing (CN)

(72) Inventors: Han Huang, San Jose, CA (US); Kai Zhang, Beijing (CN); Jicheng An, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/084,108

(22) PCT Filed: Mar. 13, 2017

(86) PCT No.: PCT/CN2017/076494
§ 371 (c)(1),
(2) Date: Sep. 11, 2018

(87) PCT Pub. No.: WO2017/157264
PCT Pub. Date: Sep. 21, 2017

(65) Prior Publication Data
US 2019/0089976 A1      Mar. 21, 2019

(30) Foreign Application Priority Data

Mar. 14, 2016   (WO) ............... PCT/CN2016/076224

(51) Int. Cl.
*H04N 19/52*      (2014.01)
*H04N 19/105*     (2014.01)
(Continued)

(52) U.S. Cl.
CPC .......... *H04N 19/52* (2014.11); *H04N 19/105* (2014.11); *H04N 19/176* (2014.11); *H04N 19/31* (2014.11);
(Continued)

(58) Field of Classification Search
CPC ........ H04N 19/33; H04N 19/52; H04N 19/91; H04N 19/176
See application file for complete search history.

(56) References Cited

U.S. PATENT DOCUMENTS 9,135,721 B2 *   9/2015   Thoreau ................. H04N 19/52
9,571,851 B2 *   2/2017   Kim ..................... H04N 19/105
(Continued)

FOREIGN PATENT DOCUMENTS

CN      1780401 A      5/2006
CN      1939066 A      3/2007
(Continued)

OTHER PUBLICATIONS

International Search Report dated Jun. 28, 2016, issued in application No. PCT/CN2016/076224.
(Continued)

*Primary Examiner* — Tsion B Owens
(74) *Attorney, Agent, or Firm* — McClure, Qualey & Rodack, LLP

(57) ABSTRACT

Apparatus and methods are described for a video encoder that uses reference motion vectors (MVs) with reduced precision to generate predicted MVs. The video encoder receives a block of pixels of a video frame and generates a MV for encoding the block of pixels by motion compensation. The video encoder creates a reduced-precision MV by reducing a precision of the generated MV based on a precision reduction scaling factor. The video encoder also
(Continued)

stores the reduced-precision MV in a MV buffer as a reference MV for temporal or spatial MV prediction.

20 Claims, 10 Drawing Sheets

(51) Int. Cl.
    *H04N 19/517*     (2014.01)
    *H04N 19/59*     (2014.01)
    *H04N 19/176*     (2014.01)
    *H04N 19/31*     (2014.01)
    *H04N 19/33*     (2014.01)
    *H04N 19/91*     (2014.01)

(52) U.S. Cl.
    CPC ........... *H04N 19/33* (2014.11); *H04N 19/517* (2014.11); *H04N 19/59* (2014.11); *H04N 19/91* (2014.11)

(56) References Cited

U.S. PATENT DOCUMENTS

| 2006/0109904 | A1 | 5/2006 | Hamada |
| 2008/0304567 | A1 | 12/2008 | Boyce et al. |
| 2009/0041124 | A1 | 2/2009 | Ohgose |
| 2010/0128790 | A1 | 5/2010 | Koana |
| 2011/0170595 | A1 | 7/2011 | Shi et al. |
| 2013/0272410 | A1 | 10/2013 | Seregin et al. |
| 2014/0307776 | A1* | 10/2014 | Srinivasan ........... H04N 19/136 375/240.02 |

FOREIGN PATENT DOCUMENTS

| CN | 102783149 A | 11/2012 |
| CN | 104335586 A | 2/2015 |
| WO | 2011/103206 A1 | 8/2011 |
| WO | 2015/105816 A3 | 7/2015 |

OTHER PUBLICATIONS

International Search Report dated May 19, 2017, issued in application No. PCT/CN2017/076494.

* cited by examiner

METHOD FOR MOTION VECTOR STORAGE IN VIDEO CODING AND APPARATUS THEREOF

CROSS REFERENCE TO RELATED APPLICATIONS

The present invention claims priority to PCT Patent Application, Serial No. PCT/CN2016/076224, filed on Mar. 14, 2016. The entire contents of the related application are incorporated herein by reference.

TECHNICAL FIELD

The present disclosure relates generally to video processing. In particular, the present disclosure relates to methods for MV storage in video coding and its extensions, three-dimensional (3D) video coding, scalable video coding, and screen content coding.

BACKGROUND

Unless otherwise indicated herein, approaches described in this section are not prior art to the claims listed below and are not admitted to be prior art by inclusion in this section.

Video coding is a process in which a sequence of video frames occupying different temporal positions is coded as a bitstream. A video encoder encodes video pixel data into the bitstream and a video decoder decodes the bitstream to reconstruct the video pixel data. Pixel data of each video frame is typically encoded as blocks of pixels (herein referred to as "pixel blocks", "coding units", and "macroblocks"). A pixel block can be encoded in the bitstream as compressed transform data or as motion vectors (MVs) that reference pixel data outside of the pixel block. The process of reconstructing a pixel block by referencing pixel data outside of the pixel block is called motion compensation. A pixel block that uses a MV to reference pixel data in other video frames in the video sequence is an inter-predicted block (as opposed to intra-coded or intra-predicted blocks, which do not reference pixel data in other video frames).

For efficient signaling of MVs, a video codec may use MV prediction to reduce the amount of motion data to be sent or stored in the bitstream. MV prediction is a technique in which a video codec generates predictions of MVs based on other MVs. The generated predictions provide some or all of the motion data needed to construct MVs used for motion compensation. The predictions are locally generated at the codec so that the amount of motion data that needs to in the bitstream is reduced.

For video encoding standards such as H.265 High Efficiency Video Coding (HEVC), there are two types of MV prediction. One is spatial MV prediction, in which a coded MV of a spatially neighboring block or prediction unit is used for predicting an MV of a current block. The other is temporal MV prediction, in which a coded MV of a reference frame is used to predict the MV of the current block.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the present disclosure provide a video encoding apparatus (or video encoder) that uses reference motion vectors (MVs) with reduced precision to generate predicted MVs. The video encoder receives a block of pixels of a video frame and generates a MV to encode the block of pixels by motion compensation. The video encoder creates a reduced-precision MV by reducing a precision of the generated MV based on a precision reduction scaling factor. The video encoder also stores the reduced-precision MV in a MV buffer as a reference MV for spatial MV prediction in encoding a subsequent block of pixels or for temporal MV prediction in encoding a future video frame. The video encoder retrieves the reference MV from the MV buffer and creates a restored-precision reference MV by restoring a precision of the retrieved reference MV according to a precision restoration scaling factor. The video encoder computes a predicted MV based on the restored-precision reference MV, a MV prediction mode, and a residual motion data. The residual motion data is computed based on a difference between the predicted MV and the generated MV. The video encoder encodes the precision reduction scaling factor, the residual motion data, and the MV prediction mode into a bitstream.

Some embodiments of the present disclosure provide a video decoding apparatus (or video decoder) that uses reference MVs with reduced precision to generate predicted MVs. The video decoder parses a bitstream to extract a precision reduction scaling factor and a residual motion data. The video decoder generates a motion compensation MV by adding the residual motion data with a predicted MV. The video decoder performs motion compensation to construct a block of pixels by using the motion compensation MV. The video decoder creates a reduced-precision motion compensation MV by reducing a precision of the motion compensation MV based on the precision reduction scaling factor. The video decoder also stores the reduced-precision motion compensation MV in a MV buffer as one of a plurality of reference MVs for decoding a subsequent block of pixels or a future video frame. The video decoder also retrieves a reference MV from the MV buffer and generates a restored-precision reference MV by restoring a precision of the retrieved reference MV based on the precision reduction scaling factor. The video decoder generates the predicted MV based on the restored-precision reference MV.

BRIEF DESCRIPTION OF DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Temporal motion vector (MV) prediction is a technique in which a video codec (encoder and/or decoder) generates predicted MVs based on actual MVs that were used for motion compensation. In some embodiments, the video codec stores the MVs that were used for motion compensation in a MV buffer in order to serve as reference MVs for future temporal MV prediction.

Spatial MV prediction is technique in which a coded MV of a spatially neighboring block or prediction unit is used for predicting an MV of a current block. In some embodiments, the video codec stores the MVs that were used for motion compensation in a line buffer or any other type of MV buffer in order to serve as reference MVs for subsequent spatial MV prediction.

Figure 1:
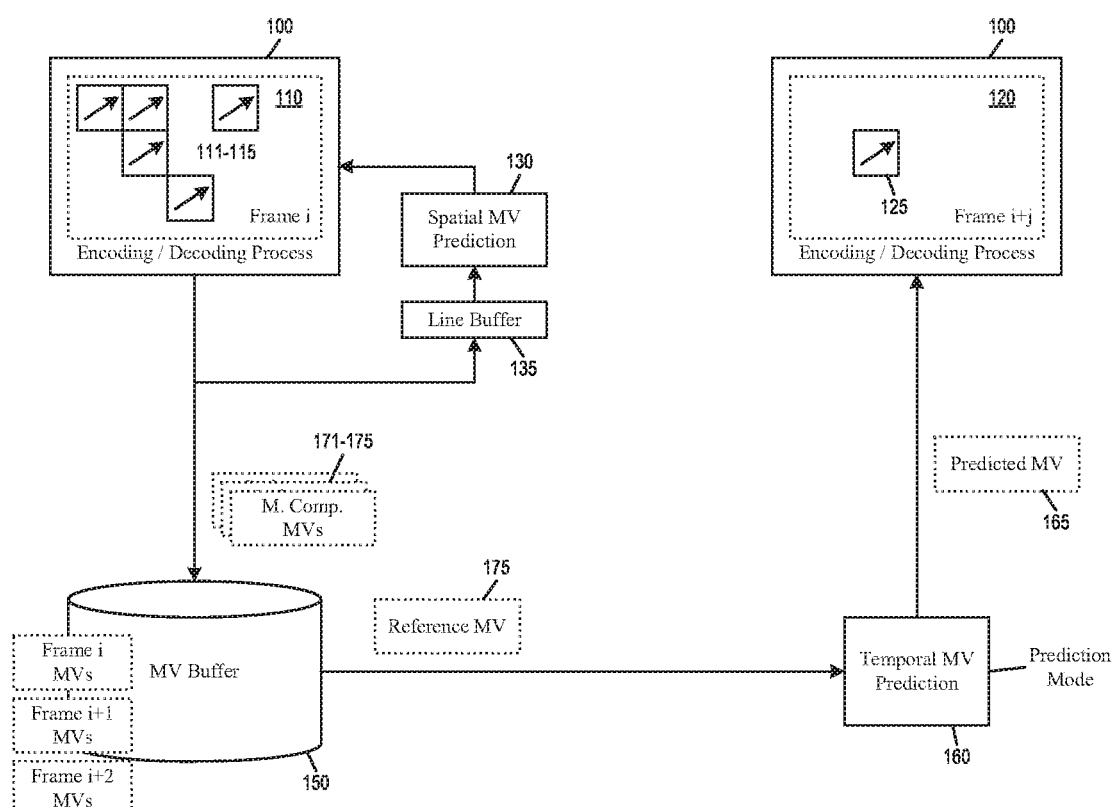
FIG. 1 illustrates storage and retrieval of reference MVs for temporal MV prediction in accordance with the present disclosure.

FIG. 1 illustrates storage and retrieval of reference MVs for temporal MV prediction at a video encoding or decoding system. An encoding/decoding process 100 that uses MVs 171-175 for motion compensation (shown as M. Comp. MVs 171-175 in FIG. 1) when constructing inter-predicted blocks 111-115 of an earlier frame 110 (frame i). At least one of the MVs 171-175 is also used for spatial MV prediction when encoding or decoding the earlier frame 110. The motion data needed for spatial MV prediction are stored in a line buffer 135, which may include the MVs 171-175 as well as reconstructed pixel data that serve as reference pixels for intra-prediction when encoding/decoding subsequent pixel blocks of the earlier frame 110.

The MVs 171-175 are stored in a MV buffer 150, which stores MVs that were used for encoding/decoding video frames. When the encoding/decoding process 100 later constructs a later frame 120 (frame i+j), a MV 175 of the earlier frame 110 (frame i) may be retrieved from the MV buffer 150 to serve as a reference MV. A MV prediction module 160 uses the retrieved reference MV 175 to perform temporal MV prediction and generate a predicted MV 165 in order to reconstruct an inter-predicted block 125 in the later frame 120. The MV prediction module 160 can be a module of software instructions being executed by one or more processing units (e.g., a processor) of a computing device. The MV prediction module can also be a module of hardware circuits implemented by one or more integrated circuits (ICs) of an electronic apparatus.

In some embodiments, the MV prediction module 160 generates the predicted MV 165 according to a specified prediction mode. In some prediction modes, the MV prediction module 160 may generate the predicted MV 165 by scaling the retrieved reference MV 175 using the temporal positions of the earlier frame 110, as a reference frame, and the current frame 120 (e.g., by interpolation or extrapolation). Examples of such prediction modes include, but are not limited to, H.265 merge mode and H.264 direct mode. Some prediction modes use the retrieved reference MV 175 as the predicted MV without scaling. Examples of such prediction modes include, but are not limited to, H.264 skip mode.

A video frame can have many inter-predicted blocks and hence may use many MVs for motion compensation. Let minBlkW and minBlkH be the minimum block width and minimum block height of an inter-prediction block, respectively. Then the maximum number of MVs that may be stored in the MV buffer is (picWidth/minBlkW)*(picHeight/minBlkH), where picWidth and picHeight are the width and height of a coded frame, respectively. Since the coding of subsequent frames may use any of the MVs for temporal MV prediction, the MV buffer may have to store up to the maximum number of MVs for each frame. The storage requirement for the MV buffer can therefore become very significant.

In order to reduce the storage requirement for the MV buffer, a video codec in some embodiments stores one MV, and not more, for each M×N block (M>minBlkW, N>minBlkH). In the case of multiple MVs in an M×N block, the video codec stores the MV at the top-left sub-block in the MV buffer as a reference MV for subsequent temporal MV prediction. In this way, the MV field is sub-sampled and the storage requirement for the MV buffer is reduced.

For High Efficiency Video Coding (HEVC), the resolution of MVs is ¼ pixel accuracy. In recent development of next-generation video coding, the MV resolution can be ⅛ pixel accuracy, 1/16 pixel accuracy, or even higher accuracy. Sources of such higher resolution MVs may include affine motion compensation, temporal MV prediction, and decoder side MV search/refine. The increase of resolution also increases the storage requirement for MVs. One possible solution is to reduce the range of MVs so that the same number of bits can be used to represent a MV. However, this will degrade the performance of video coding by motion compensation in the case of fast motion scenario.

To reduce the MV storage requirement without negatively impacting the performance of motion compensation, some embodiments of the present disclosure provide a method for reducing the storage requirement for the MV buffer. The method reduces the precision (number of bits used to express a value) or the resolution (number of addressable locations based on the size of the smallest addressable pixel unit) of MVs before storing them in the MV buffer as reference MVs. When using a reference MV for temporal MV prediction and/or motion compensation, the method retrieves the reference MV from the MV buffer and restores the resolution of the reference MV before performing temporal MV prediction and/or motion compensation. In some embodiments, the same technique is applicable for reducing the MV storage requirement at the line buffer, specifically, by reducing the precision/resolution of MVs for storage in the line buffer as reference MVs and restoring the resolution of the stored reference MVs when performing spatial MV prediction.

Figure 2:
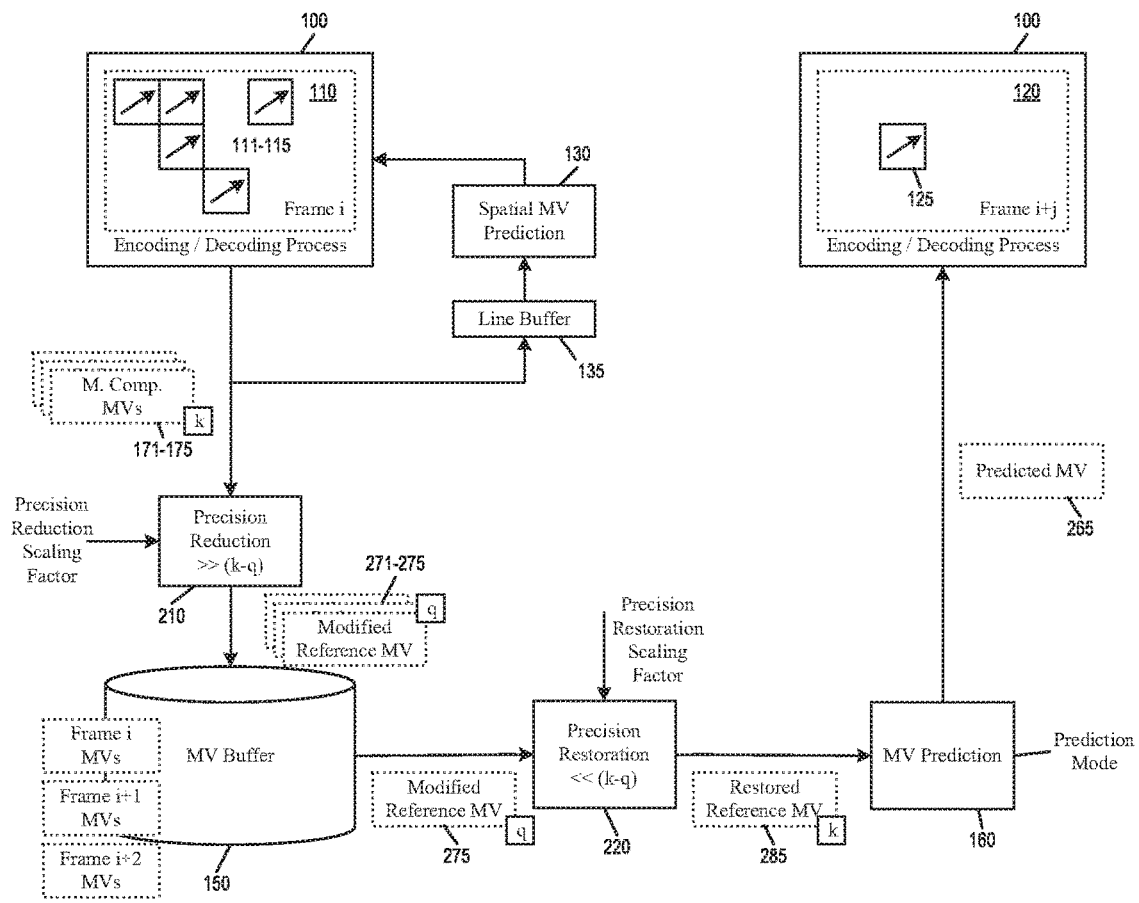
FIG. 2 illustrates reducing storage requirement of a MV buffer by reducing the resolution of reference MVs before storage in accordance with the present disclosure.

FIG. 2 illustrates a video encoding or decoding system that reduces the storage requirement of the MV buffer by reducing the resolution of reference MVs before storage.

As illustrated, the encoding/decoding process 100 encodes (or decodes) the earlier frame 110 (frame i) by performing motion compensation by using the MVs 171-175. The MVs 171-175 are also stored in the line buffer 135 for spatial MV prediction. These MVs have k bits of precision. Before storing the MVs 171-175, a precision reduction operation 210 reduces the precision of the reference MVs 171-175 to produce modified reference MVs 271-275 for storage at the MV buffer 150. These modified reference MVs 271-275 have q bits of precision. When q is less than k, the modified reference MVs 271-275 are reduced-precision MVs that require less storage than the original reference MVs 171-175.

In some embodiments, when there are multiple MVs in a pixel block, the video codec selects one MV, and not more, of the block (e.g., the MV of the top-left sub-block of the block) for storage in the MV buffer 150 in order to sub-sample the MV field. In these instances, the selected MVs (but not non-selected MVs) go through the precision reduction operation 210 and are stored in the MV buffer 150 as reference MVs.

When the encoding/decoding process 100 encodes (or decodes) the later frame 120 (Frame i+j), a modified (reduced-precision) reference MV 275 is retrieved from the MV buffer 150. A precision restoration operation 220 restores the precision of the reference MV 275 to produce a restored reference MV 285, which is in turn used by the MV prediction module 160 to generate a predicted MV 265 for the encoding/decoding process 100.

It is worth noting that the predicted MV 265 is likely different than the predicted MV 165 of FIG. 1. This is because the MV 265 is computed based on the restored reference MV 285, which has lost several bits of information during the precision reduction process 210.

For some embodiments, the following quantitatively describes the precision reduction operation 210 and the precision restoration operation 220:

Let $\vec{v}=(v_x,v_y)$ denote a MV (e.g., MVs 171-175) that is used for motion compensation (by inter-prediction). Its precision is k bits, with k being an integer (2, 3, 4, and so on). This corresponds to a resolution based on $1/2^k$ pixel (i.e., the smallest addressable pixel unit for $v_x,v_y$ is $1/2^k$ pixel). After a frame is encoded (or decoded), all the MVs used for encoding (or decoding) the frame are stored in the MV buffer (e.g., MV buffer 150) as reference MVs for subsequent MV prediction. The precision reduction operation 210 modifies the MV $\vec{v}=(v_x,v_y)$ into a modified reference MV $\vec{v}'=(v_x',v_y')$ having a precision of q bits (or a resolution based on $1/2^q$ pixel), where q is smaller than k. The precision reduction is bitwise right-shift or down-shift by k-q bits, as expressed mathematically below.

$$v_x'=v_x>>(k-q), v_y'=v_y>>(k-q) \quad \text{Eq.(1)}$$

The modified reference MV $\vec{v}'=(v_x',v_y')$ is then stored in the MV buffer. When a reference MV is required for temporal MV prediction, its corresponding modified reference MV is retrieved from the MV buffer. The precision restoration operation 220 then restores the modified reference MV $\vec{v}'=(v_x',v_y')$ to the original resolution $1/2^k$, e.g., by performing bit-wise left-shift or up-shift by k-q bits, as expressed mathematically below.

$$\vec{v}'=\vec{v}'<<(k-q) \quad \text{Eq. (2)}$$

In some embodiments, the precision reduction operation 210 rounds up the motion compensation MV before performing precision reduction. This minimizes the truncation error associated with the precision reduction operation. Specifically, the precision reduction operation 210 produces the modified reference MV $\vec{v}'=(v_x',v_y')$ according to the bitwise down-shift operation with round-up expressed mathematically below.

$$o=1<<(k-q-1), v_x'=(v_x+o)>>(k-q), v_y'=(v_y+o)>>(k-q) \quad \text{Eq.(3)}$$

When used for temporal MV prediction, the modified reference MV is restored to its original resolution before scaling, e.g., according to Eq. (2). This restored reference MV reflects the round-up operation performed at the precision reduction operation 210.

In some embodiments, instead of reducing precision by down-shifting and restoring precision by up-shifting, the precision reduction operation 210 reduces precision by dividing the original motion compensation MVs by a power of two integer derived from k and q (e.g., $2^{k-q}$), and the precision restoration operation 220 restores precision by multiplying the modified reference MV with a power of two integer derived from k and q (e.g., $2^{k-q}$). Specifically, the motion compensation MV $\vec{v}=(v_x,v_y)$ is modified (reduce precision) according to the mathematical expression below.

$$v_x'=v_x \div (1<<(k-q)) \text{ and } v_y'=v_y \div (k-q)) \quad \text{Eq. (4)}$$

When used for temporal MV prediction, the modified reference MV is restored to the original precision according to the mathematical expression below.

$$v_x=v_x' \times (1<<(k-q)) \text{ and } v_y=v_y' \times (1<<(k-q)). \quad \text{Eq. (5)}$$

In some embodiments, the quantity k−q (which is the difference between k and q) is referred to as a scaling factor d, which is the number of bits to shift during precision reduction or precision restoration. The scaling factor d is used as a precision reduction scaling factor when the precision reduction operation 210 down-shifts the reference MV by k−q bits (e.g., according to Eqs. (1), (3) and (4)). The scaling factor d is used as a precision restoration scaling factor when the precision restoration operation 220 up-shifts the reference MV by k−q bits (e.g., according to Eqs. (2) and (5)).

In some embodiments, the equations (1) through (5) implementing the precision reduction operation 210 and the precision restoration operation 220 are applicable for both storing MVs in the MV buffer 150 for temporal MV prediction as well as for storing MVs in the line buffer 135 for spatial MV prediction.

In some embodiments, the MVs stored in the MV buffer can be used for spatial MV prediction, temporal MV prediction, or both. However, the precision or resolution of MVs used for motion compensation can be different from the precision or resolution of MVs used for spatial MV prediction. When a motion compensation MV is used for both spatial MV prediction and temporal MV prediction, the precision or resolution of the motion compensation MV is first reduced for spatial MV prediction (and may be stored in the line buffer), then reduced again for storage in the MV buffer.

Figure 3:
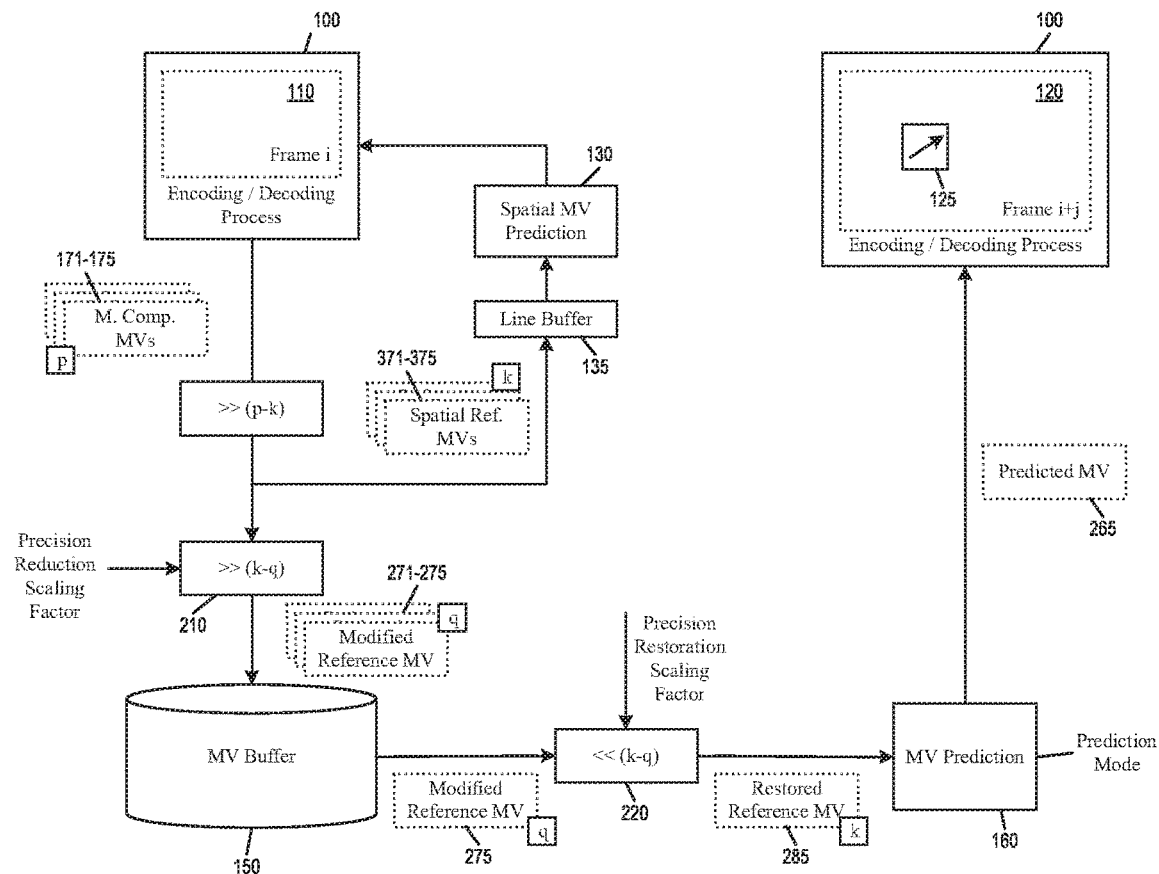
FIG. 3 illustrates the video encoding or decoding system reducing the resolution of reference MVs initially for spatial MV prediction and again for storage for future temporal MV prediction.

FIG. 3 illustrates the video encoding or decoding system reducing the resolution of reference MVs initially for spatial MV prediction and again for storage for future temporal MV prediction. As illustrated, the resolution of the MVs 171-175 used for motion compensation is of $½^p$ pixel accuracy, p>k, the resolution of the MVs 371-375 used for spatial MV prediction is of $½^k$ pixel accuracy, and the resolution of the MVs 271-275 used for temporal MV prediction is of $½^q$ pixel accuracy. The video encoding or decoding system first modifies the MVs 171-175 to the resolution of $½^k$ pixel accuracy for spatial MV prediction, and then further modifies the MVs 371-375 to the resolution of $½^q$ pixel accuracy for temporal MV prediction before storage in the MV buffer as reference MV 271-275 for subsequent spatial or temporal MV prediction.

For example, during affine motion compensation, the resolution of a MV used for motion compensation of each sub-block can be based on pixel accuracies of 1/16, 1/64 or even finer. However, the resolution of a MV that is used for spatial MV prediction for subsequent blocks of the same video frame is based on pixel accuracy of 1/8. In these instances, the precision of the motion compensation MV is first modified to have a resolution based on 1/8 pixel accuracy for spatial MV prediction, and then further modified to have a resolution based on 1/4 pixel accuracy for storage in the MV buffer for subsequent temporal MV prediction and/or spatial MV prediction.

Figure 4:
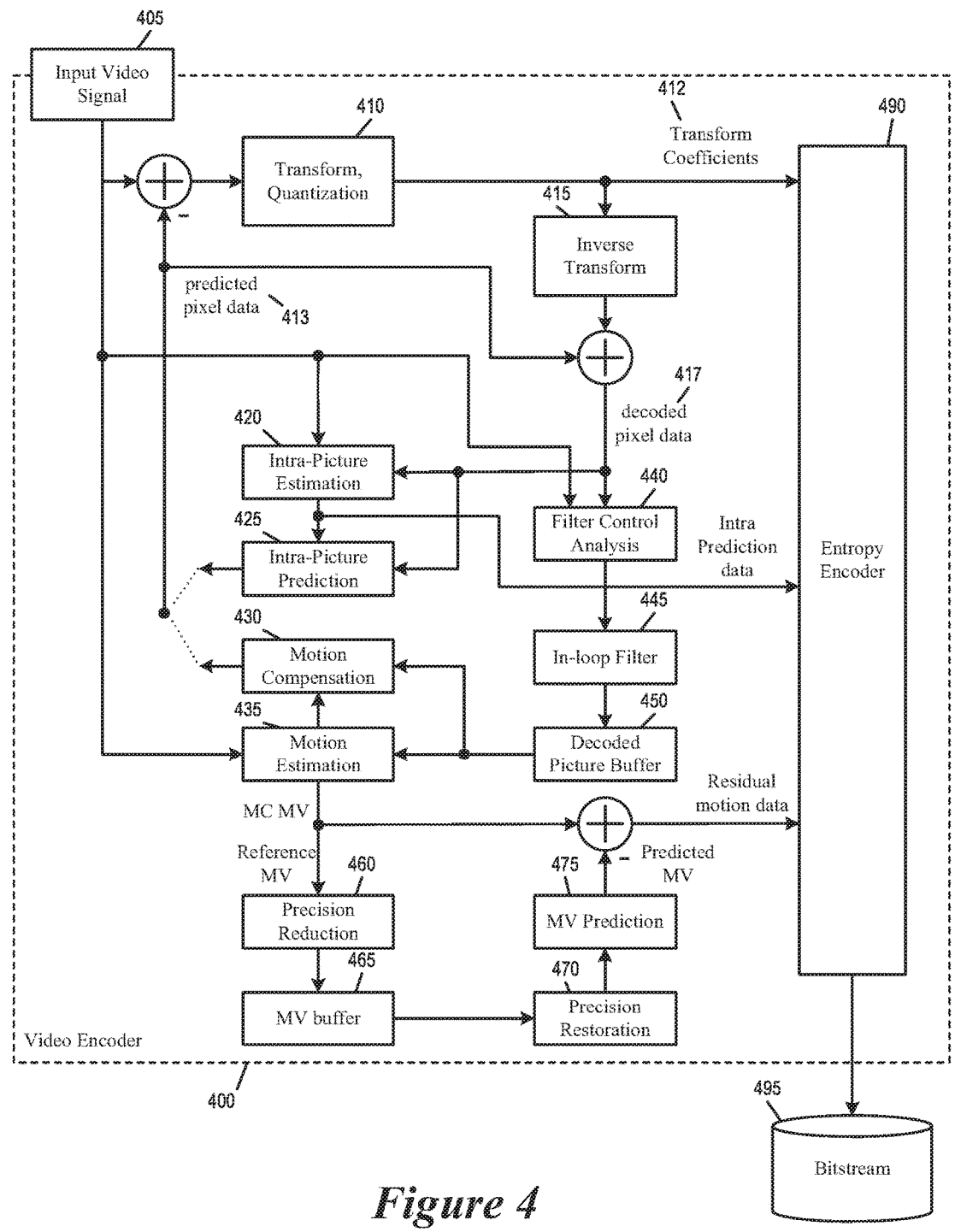
FIG. 4 illustrates a video encoder that performs MV prediction based on modified reference MVs with reduced precision in accordance with the present disclosure.

FIG. 4 illustrates a video encoder 400 or video encoding apparatus that performs MV prediction based on modified reference MVs with reduced precision. Specifically, the video encoder 400 generates MVs for motion compensation and stores the generated motion compensation MVs as reference MVs for subsequent temporal and/or spatial MV prediction. The video encoder 400 reduces the precision of the reference MVs before storage and restores the precision for MV prediction.

As illustrated, the video encoder 400 receives input video signal 405 and encodes the signal into bitstream 495. The video encoder 400 has several components or modules for encoding the video signal 405, including a transform and quantization module 410, an inverse transform module 415, an intra-picture estimation module 420, an intra-picture prediction module 425, a motion compensation module 430, a motion estimation module 435, a filter control analysis module 440, an in-loop filter 445, a decoded picture buffer 450, and an entropy encoder 490. In addition, the video encoder 400 has several modules for temporal MV prediction, namely: a precision reduction module 460, a MV buffer 465, a precision restoration module 470, and a MV prediction module 475. The various components of the video encoder 400 jointly perform an encoding process that is similar to the encoding/decoding process 100 described by reference to FIGS. 1 and 2 above.

In some embodiments, the modules 410-490 are modules of software instructions being executed by one or more processing units (e.g., a processor) of the computing device 105. In some embodiments, the modules 410-490 are modules of hardware circuits implemented by one or more integrated circuits (ICs) of an electronic apparatus. Though the modules 410-490 are illustrated as being separate modules, some of the modules can be combined into a single module. For example, the precision restoration module 470 can be merged into the MV prediction module 475.

The input video signal 405 is a raw video signal that presents pixel data of each video frame without compression. The transform and quantization module 410 converts the pixel data of the raw video (minus predicted pixel data 413 from the intra-prediction module 425 or the motion compensation module 430) into quantized transform coefficients 412 (e.g., from Discrete Cosine Transform, or DCT) to be encoded into the 495 bitstream by the entropy encoder 490. The inverse transform module 415 performs inverse transform on the transform coefficients 412 and produces decoded pixel data 417 (after adding prediction pixel data 413). In some embodiments, the decoded pixel data 417 is temporarily stored in a line buffer (not illustrated) for intra-picture prediction and spatial MV prediction.

The intra-picture estimation module 420 performs intra-prediction based on the decoded pixel data 417 to produce intra prediction data. The intra-prediction data is provided to the entropy encoder 490 to be encoded into bitstream 495. The intra-prediction data is also used by the intra-picture prediction module 425 to produce the predicted pixel data 413.

The motion estimation module 435 performs inter-prediction by producing MVs to reference pixel data of previously decoded frames stored in the decoded picture buffer 450. These MVs are provided to the motion compensation module 430 to produce predicted pixel data. These MVs are also necessary for reconstructing video frame at the decoder. Instead of encoding the complete actual MVs in the bitstream, the video encoder 400 uses temporal MV prediction to generate predicted MVs, and the difference between the MVs used for motion compensation and the predicted MVs is encoded as residual motion data and stored in the bitstream 495 for the decoder.

The video encoder 400 generates the predicted MVs based on reference MVs that were generated for encoding previously video frames, i.e., the motion compensation MVs that were used to perform motion compensation. The video encoder 400 retrieves reference MVs from previous video frames from the MV buffer 465. The video encoder 400 stores the MVs generated for the current video frame in the MV buffer 465 as reference MVs for generating predicted MVs.

The video encoder 400 reduces the precision or resolution of the reference MVs for storage in the MV buffer 465. The video encoder 400 restores the precision or resolution of a reference MV when it is retrieved for use for MV prediction. In some embodiments, the generated MVs are also stored in a line buffer (not illustrated) as reference MVs for spatial MV prediction. The video encoder 400 reduces the precision or resolution of the reference MVs for storage in the line buffer (and restores the precision upon retrieval).

Within the video encoder 400, the precision reduction module 460 receives the motion compensation MVs from the motion estimation module 435 as reference MVs. The precision reduction module 460 then reduces the precision of the reference MVs by performing the precision reduction operation 210 of FIG. 2 described above (e.g. according to Eq. (1), (3), or (4)). In some embodiments, when there are multiple MVs in a pixel block, the video encoder 400 selects only one MV of the block (e.g., the MV of the top-left sub-block of the block) for storage in the MV buffer in order to sub-sample the MV field. In these instances, the selected MVs, and not others, go through the precision reduction module 460 and are stored in the MV buffer 465 as reference MVs.

The modified (reduced-precision) reference MVs are stored in the MV buffer 465 for performing spatial MV prediction and/or temporal MV prediction of later video frames. The precision restoration module 470 receives reference MVs retrieved from the MV buffer 465 and restores their precision by performing precision restoration operation 220 of FIG. 2 described above (e.g., according to Eq. (2) or (5).)

The MV prediction module 475 uses the restored reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 495 by the entropy encoder 490.

The entropy encoder 490 encodes various parameters and data into the bitstream 495 by using entropy encoding techniques such as context-adaptive binary arithmetic coding (CABAC) or Huffman encoding. The entropy encoder 490 encodes parameters such as quantized transform data, residual motion data, precision reduction scaling factor, and precision restoration scaling factor into the bitstream.

Figure 5:
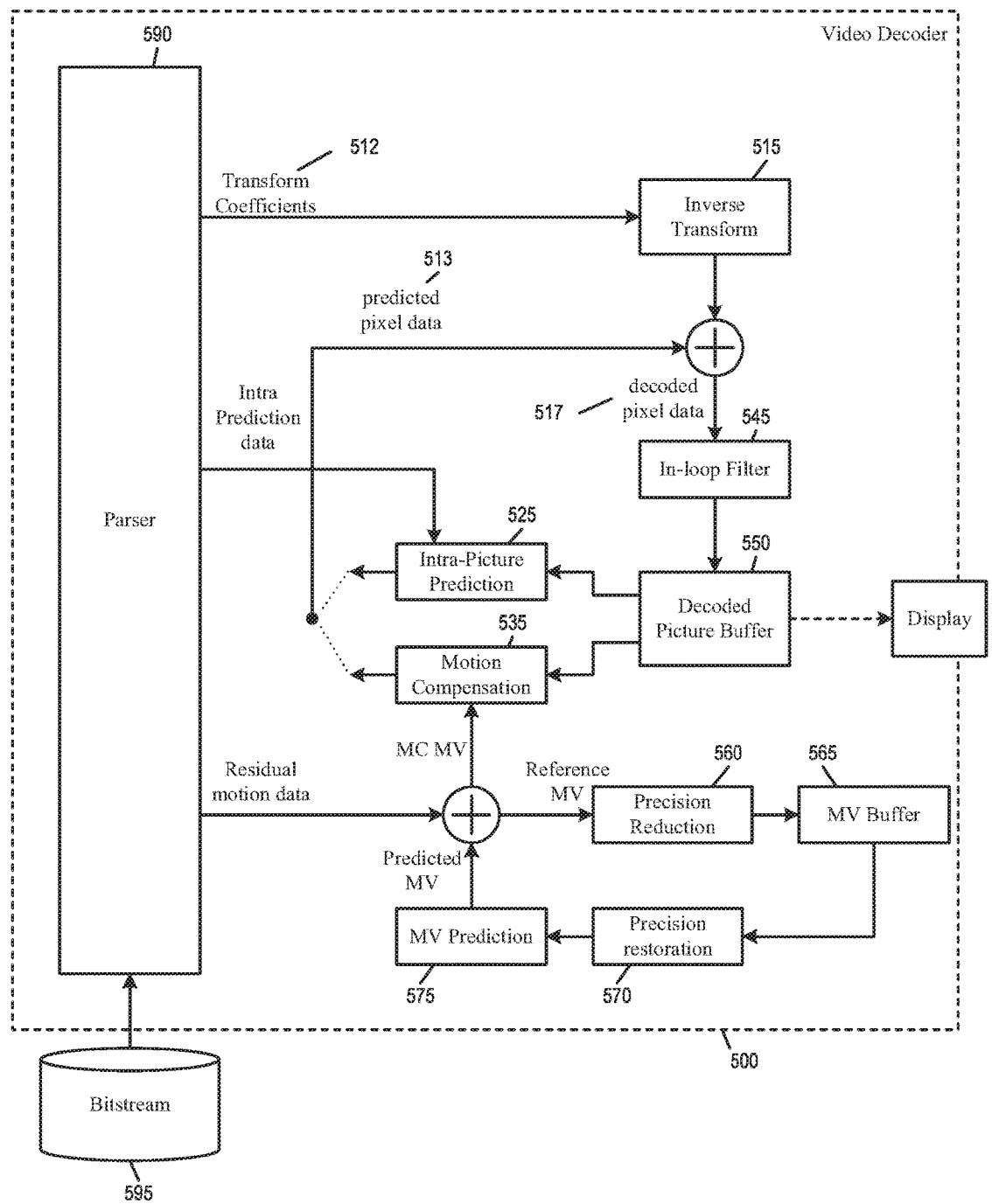
FIG. 5 illustrates a video decoder that performs MV prediction based on modified reference MVs with reduced precision in accordance with the present disclosure.

FIG. 5 illustrates a video decoder 500 or a video decoding apparatus that performs MV prediction based on modified reference MVs with reduced precision. Specifically, the video decoder 500 generates MVs for motion compensation and stores the generated MVs as reference MVs for subsequent MV prediction. The video decoder 500 reduces the precision of the reference MVs before storage and restores the precision for MV prediction.

As illustrated, the video decoder 500 receives a bitstream 595 and decodes the content of the bitstream into pixel data of video frames for display. The video decoder 500 has several components or modules for decoding the bitstream 595, including an inverse transform module 515, an intra-picture prediction module 525, a motion compensation module 535, an in-loop filter 545, a decoded picture buffer 550, and bitstream parser 590. In addition, the video decoder 500 may also include several modules for temporal MV prediction, namely: a precision reduction module 560, a MV buffer 565, a precision restoration module 570, and a MV prediction module 575. The various components of the video decoder 500 jointly perform a decoding process that is similar to the encoding/decoding process 100 described by reference to FIGS. 1 and 2 above.

In some embodiments, the modules 510-590 are modules of software instructions being executed by one or more processing units (e.g., a processor) of a computing device. In some embodiments, the modules 510-590 are modules of hardware circuits implemented by one or more ICs of an electronic apparatus. Though the modules 510-590 are illustrated as being separate modules, some of the modules can be combined into a single module. For example, the precision restoration module 570 can merge into the MV prediction module 575.

The inverse transform module 515 performs inverse transform on the transform coefficients 512 and produces decoded pixel data 517 (after adding predicted pixel data 513 from the intra-prediction module 525 or the motion compensation module 535). The decoded pixel data 517 is stored in the decoded picture buffer 550. The intra-picture prediction module 525 receives intra-prediction data from bitstream 595 and according to which, produces the predicted pixel data 513 from the decoded pixel data 517 stored in the decoded picture buffer 550. In some embodiments, the decoded pixel data 517 is also stored in a line buffer (not illustrated) for intra-picture prediction and spatial MV prediction.

The motion compensation module 535 produces predicted pixel data 513 from the decoded pixel data stored in the decoded picture buffer 550 according to motion compensation MVs (MC MVs). These motion compensation MVs are reconstructed by adding the residual motion data received from the bitstream 595 with predicted MVs received from the MV prediction module 575.

The video decoder 500 generates the predicted MVs based on reference MVs that were generated for decoding previously video frames, i.e., the motion compensation MVs that were used to perform motion compensation. The video decoder 500 retrieves the reference MVs of previous video frames from the MV buffer 565. The video decoder 500 also stores the motion compensation MVs generated for decoding the current video frame in the MV buffer 565 as reference MVs for producing predicted MVs.

The video decoder 500 reduces the precision or resolution of the reference MVs for storage in the MV buffer 565. The video decoder 500 restores the precision or resolution of a reference MV when the MV is retrieved from the MV buffer 565 for temporal MV prediction or spatial MV prediction. In some embodiments, the reference MVs are also stored in a line buffer (not illustrated) for spatial MV prediction. The video decoder 500 reduces the precision or resolution of the reference MVs for storage in the line buffer (and restores the precision upon retrieval).

Within the video decoder 500, the precision reduction module 560 receives MVs that are used for motion compensation. The reconstructed MVs are to be stored as reference MVs for spatial MV prediction and/or temporal MV prediction of future video frames. The precision reduction module 560 then reduces the precision of the reference MVs by performing the precision reduction operation 210 of FIG. 2 described above (e.g. according to Eq. (1), (3), or (4)). In some embodiments, when there are multiple MVs in a pixel block, the video decoder 500 selects only one MV of the block (e.g., the MV of the top-left sub-block of the block) for storage in the MV buffer 565 in order to sub-sample the MV field. In these instances, only the selected MVs go through the precision reduction operation 210 and are stored in the MV buffer 150 as reference MVs.

The precision restoration module 570 receives reference MVs from the MV buffer 565 and restores their precision. The precision restoration module 570 receives reference MVs retrieved from the MV buffer 565 and restores their precision by performing precision restoration operation 220 of FIG. 2 described above (e.g., according to Eq. (2) or (5).)

The MV prediction module 575 uses the restored reference MVs to create the predicted MVs based on spatial MV prediction or temporal MV prediction. The predicted MVs are added with the residual motion data received from the bitstream 595 to reconstruct MVs for motion compensation as well as to serve as reference MVs for future MV prediction.

In some embodiments, the modified precision/resolution of the reference MVs is signaled from the encoder to the decoder through the bitstream. This is necessary since the precision/resolution of the reference MVs affects the value of the residual motion data that is encoded in the bitstream. Thus, to accurately reconstruct MVs for motion compensation, the video decoder in some embodiments reduce and restore the precision/resolution of its reference MVs by exactly the same amount as the encoder.

In some embodiments, the video encoder conveys the scaling factor used for precision reduction and precision restoration to the video decoder by encoding the scaling factor in the bitstream. In some embodiments, this scaling factor is expressed as "d", which is the number of bits to shift during precision reduction or precision restoration. Specifically, d=k−q, "k" being the precision of the original MVs and "q" being the precision of the reduced reference MVs.

Figure 6:
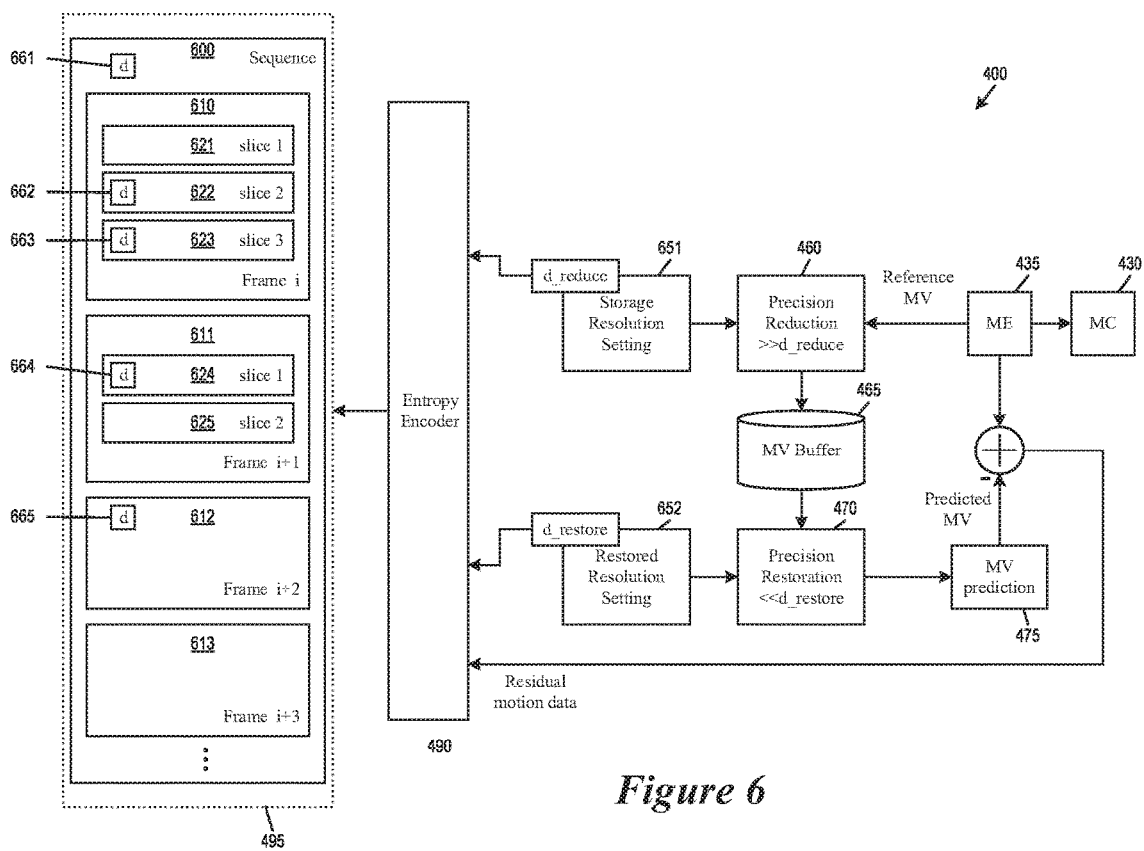
FIG. 6 conceptually illustrates a video encoder that conveys the scaling factor of MV precision reduction to a video decoder in accordance with the present disclosure.

FIG. 6 conceptually illustrates a video encoder that conveys the scaling factor of MV precision reduction to the decoder. Specifically, the figure illustrates the video encoder 400 reducing and restoring the precision/resolution of reference MVs based on a scaling factor and then encodes the scaling factor in the bitstream 495 for conveyance to the video decoder 500.

As illustrated, the precision reduction module 460 of the video encoder 400 receives motion compensation MVs from the motion estimation module 435 as reference MVs for storage in the MV buffer. The precision reduction module 460 reduces the precision of the reference MVs according to a scaling factor "d_reduce" that is provided by a storage resolution setting 651 (e.g., a control/configuration register). Likewise, the precision restoration module 470 receives reference MVs retrieved from the MV buffer 465 for computing the predicted MV. The precision restoration module 470 restores the precision of the reference MVs according to a scaling factor "d_restore" that is provided by a restored resolution setting 652. The entropy encoder 490 captures the settings 651 and 652 and encodes the scaling factors used for precision reduction and precision restoration into the bitstream 495 for conveyance to video decoders.

Video encoders in different embodiments use different methods and/or formats to encode the precision reduction/restoration scaling factors. In some embodiments, the precision reduction scaling factor ("d_reduce") and the precision restoration scaling factor ("d_restore") are the same, so the entropy encoder 490 encodes a single precision reduction parameter (d) into the bitstream to convey the scaling factors.

In some embodiments, the video encoder may dynamically change the scaling factor for precision reduction and restoration during encoding. For example, the video encoder may use a first scaling factor for reducing the precision of motion compensation MVs of a first video frame and then switch to a second, different the scaling factor for reducing the precision of motion compensation MVs of a second video frame. In these instances, the scaling factor "d_reduce" for precision reduction may not be the same as the scaling factor "d_restore" for precision restoration since the reference MVs being stored belong to the frame currently encoded while the reference MVs being retrieved belong to a frame encoded in the past. The encoder in some of these embodiments stores both "d_reduce" and "d_restore" in the bitstream.

In some embodiments, instead of storing the scaling factor "d_reduce", "d_restore", "d" into the bitstream, the value k (the precision of the original MVs) and the value q (the precision of the reduced-precision reference MVs) are stored in the bitstream.

A scaling factor for precision reduction or restoration (whether d, d_reduce, d_restore, k, q) can be encoded in the bitstream at various levels of the video coding hierarchy as a parameter or a set of parameters. For example, the precision reduction scaling factor can be encoded as a parameter in video parameter set (VPS), picture parameter set (PPS), sequence parameter set (SPS), slice header (SH), coding tree unit (CTU), coding unit (CU), etc., such that reference MVs of different video frames can have different precisions/resolutions when stored in the MV buffer. The precision reduction scaling factor can also be encoded as a parameter in a slice header, such that reference MVs of different slices can have different precisions/resolutions when stored in the MV buffer.

In some embodiments, the resolution of MV prediction for the current slice can be signaled in the current slice, and the information of the resolution of the stored MV of the current slice used as reference MV in MV prediction for subsequent slices can be signaled in the current slice. In some embodiments, the information of the resolution of stored MV of the current slice used as reference MV in MV prediction for subsequent slices can be signaled in the subsequent slices.

FIG. 6 also conceptually illustrates a bitstream that encodes precision reduction and restoration scaling factors. As illustrated, the bitstream 495 includes a video sequence 600 that encompasses frames 610-613. The frame 610 includes slices 621-623. The frame 611 includes slices 624-625.

The sequence 600 has a parameter 661 in its sequence parameter set that signals the scaling factor. The frame 612 has a parameter 665 in its picture parameter set that signals the scaling factor. The slices 622, 623 and 624 have parameters 662, 663, 664 in their respective slice headers that signal the scaling factor.

In some embodiments, each signaled scaling factor is applicable to (e.g., as its scope is limited to) its corresponding video coding hierarchical entity (unless overridden by lower level entities that have their own scaling factors). For example, the scaling factor 661 of the sequence 600 is applicable to MVs in frames and slices within the sequence 600, while the scaling factor 662 is applicable to MVs in the slice 622 and not MVs of other frames and slices. In some embodiment, each signaled scaling factor is applicable to all subsequent video coding hierarchical entities until another scaling factor is signaled in the bitstream. For example, the scaling factor signaled by the parameter 664 at the slice 624 is applicable to the slices 624, 625, etc., until the parameter 665 is signaled at the picture parameter set of the frame 612.

In some embodiments, each scaling factor (labeled "d") parameter may signal a scaling factor for reducing the precision of reference MVs (i.e., "d_reduce") and/or a scaling factor for restoring the precision of reference MVs (i.e., "d_restore"). In some embodiments, each scaling factor parameter may signal the value k (the precision of the original MVs) and the value q (the precision of the reduced reference MVs).

Figure 7:
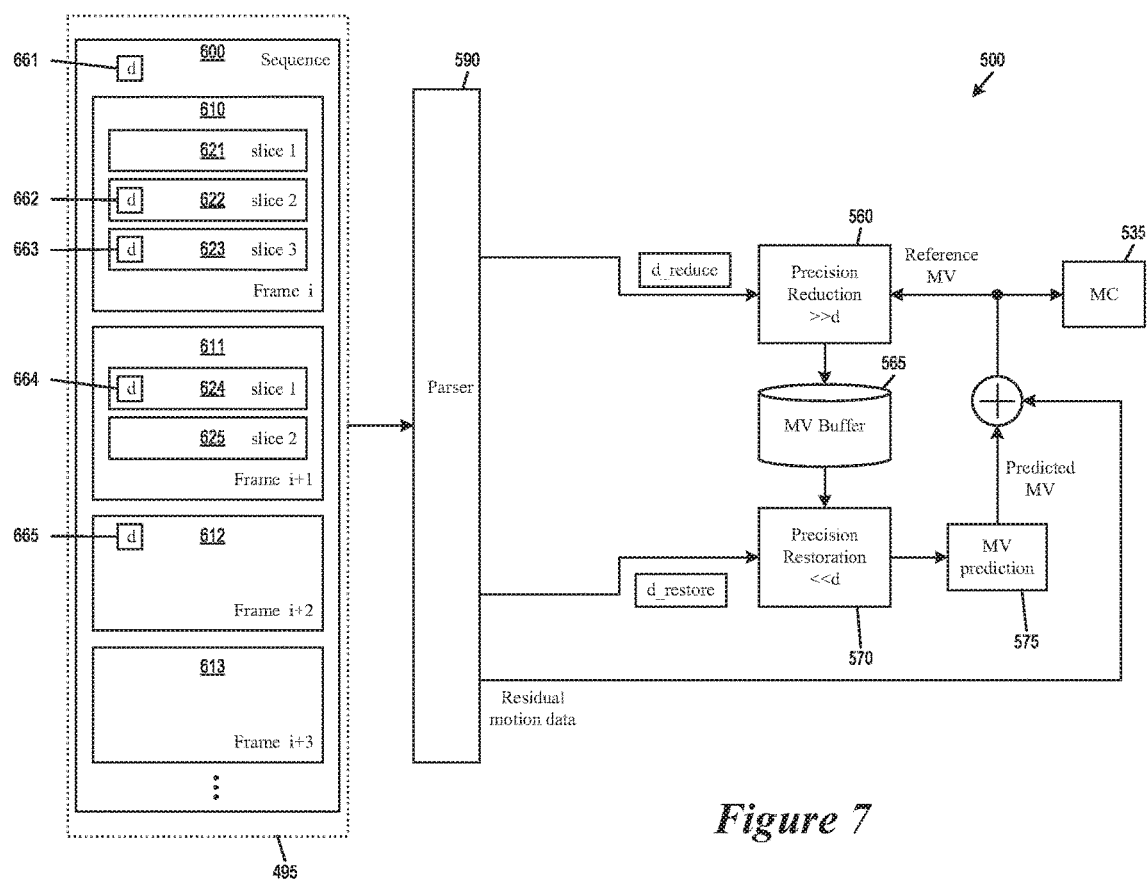
FIG. 7 conceptually illustrates a video decoder that receives the scaling factors of MV precision reduction from a bitstream in accordance with the present disclosure.

FIG. 7 conceptually illustrates a video decoder that receives the scaling factors of MV precision reduction from a bitstream. Specifically, the figure illustrates the video decoder 500 receiving scaling factors from the bitstream 495 and reducing and restoring the precision/resolution of reference MVs according to the received scaling factors.

As illustrated, the video decoder 500 receives the bitstream 495 and the parser 590 extracts various parameters from the bitstream by performing an inverse function of the entropy encoder 490. The parser 590 extracts the precision reduction scaling factor ("d_reduce") and the precision restoration scaling factor ("d_restore") and provide them to the precision reduction module 560 and the precision restoration module 570, respectively.

The precision reduction module 560 receives reference MVs (which are motion compensation MVs derived from the predicted MVs from the MV prediction module 575 and the residual motion data received from the parser 590) and reduces the precision of the reference MVs according to the scaling factor "d_reduce" (e.g., down-shift by d_reduce bits) for storage in the MV buffer 565. The precision restoration module 570 receives reference MVs retrieved from the MV buffer 565 and restores the precision of the reference MVs according to scaling factor "d_restore" (e.g., up-shift by d_restore bits).

As mentioned, in some embodiments, the MVs generated for motion compensation are also stored in line buffer as reference MVs for spatial MV prediction, where the precision of the reference MVs are reduced for storage and restored for use by spatial MV prediction. In some embodiments, the scaling factor for storing reference MVs in the line buffer is the same as the scaling factor for storing reference MVs in the MV buffer. In some embodiments, the scaling factor for storing reference MVs in the line buffer may be different from the scaling factor for storing reference MVs in the MV buffer. In some of these embodiments, the scaling factor for storing reference MVs in the line buffer is signaled by parameters encoded in the bitstream (at e.g., VPS, SPS, PPS, slice header, coding units, coding tree units).

Figure 8:
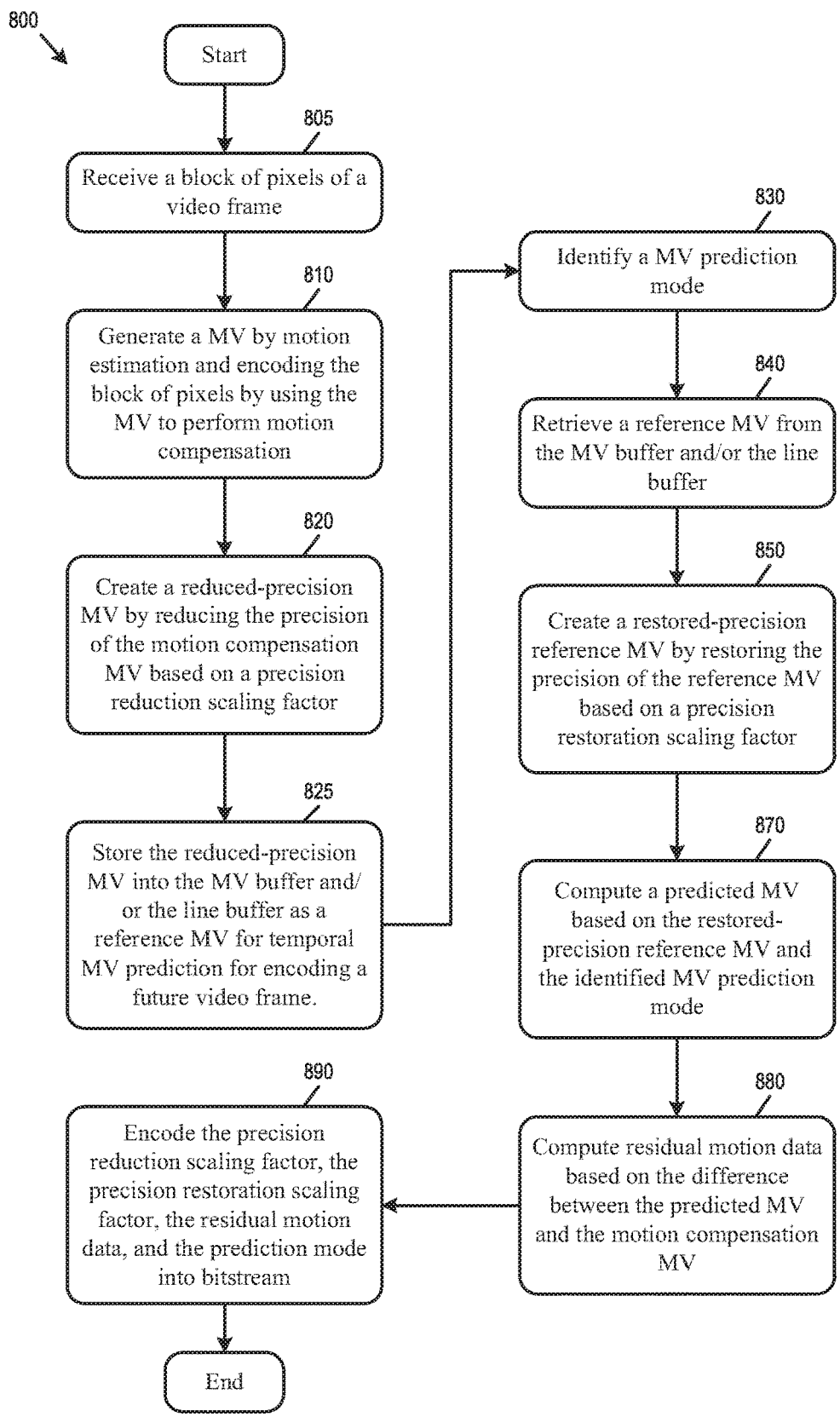
FIG. 8 conceptually illustrates a process for encoding a block of pixels by MV prediction based on reference MVs with reduced precision/resolution in accordance with the present disclosure.

FIG. 8 conceptually illustrates a process 800 for encoding a block of pixels by MV prediction based on reference MVs with reduced precision/resolution. In some embodiments, one or more processing units (e.g., processor(s)) of a computing device implementing the video encoder 400 may perform the process 800. In some embodiments, an electronic apparatus having one or more ICs that implement the video encoder 400 may perform the process 800.

The process 800 starts when the video encoder 400 receives (at step 805) a block of pixel of a video frame. The pixels in the block are received as uncompressed video signal. The video encoder 400 generates (at step 810) a MV by motion estimation and encodes the block of pixels by using the generated MV to perform motion compensation (so the generated MV is a motion compensation MV).

The video encoder 400 creates (at step 820) a reduced-precision MV by reducing the precision of the motion compensation MV based on a precision reduction scaling factor (e.g., by down-shifting the motion compensation MV according to "d_reduce"). The precision reduction operation is described by reference to precision reduction operation 210 of FIG. 2 (e.g, according to Eqs. (1), (3), and (4)). The precision reduction scaling factor is applicable for a video coding hierarchical entity that encompass the block of pixels (e.g., a slice, a frame, or a sequence). In some embodiments, the video encoder 400 may generate multiple MVs for the block of pixels, but only one MV of the block is selected for storage as reference MV in order to sub-sample the MV field. In these instances, the selected MV of the block, and no other MVs, go through the step 820 and is stored as a reference MV.

The video encoder 400 then stores (at step 825) the reduced-precision MV into the MV buffer and/or the line buffer as a reference MV for encoding the current video frame by spatial prediction and/or a future video frame by temporal MV prediction.

Next, the video encoder 400 identifies (at step 830) a MV prediction mode. The video encoder 400 in some prediction modes generates the predicted MV by scaling the retrieved reference MV using the temporal positions of the reference frame (the video frame of the reference MV) and the current frame. Examples of such prediction modes include H.265 merge mode and H.264 direct mode. Some prediction modes use the retrieved reference MV as the predicted MV without scaling. Examples of such prediction modes include H.264 skip mode.

The video encoder 400 also retrieves (at step 840) a reference MV from the MV buffer and/or the line buffer. The video encoder 400 then creates (at step 850) a restored-precision reference MV by restoring the precision of the reference MV based on a precision restoration scaling factor (e.g., by up-shifting the reference MV according to "d_restore"). The precision restoration operation is described by reference to precision restoration operation 220 of FIG. 2 (e.g., according to Eqs. (2), and (5).) The precision restoration scaling factor is applicable for a video coding hierarchical entity that encompass the block of pixels (e.g., a slice, a frame, or a sequence).

The video encoder 400 then computes (at step 870) a predicted MV based on the restored-precision reference MV according to the identified MV prediction mode, which can be temporal MV prediction or spatial MV prediction. The video encoder 400 also computes (at step 880) a residual motion data based on the difference between the predicted MV and the motion compensation MV generated at step 810.

Next, the video encoder 400 encodes (at step 890) the precision reduction scaling factor ("d_reduce"), the precision restoration scaling factor ("d_restore"), the residual motion data, and the prediction mode into the bitstream. The precision reduction scaling factor and the precision restoration scaling factor may be encoded as parameters in VPS, SPS, PPS, or slice headers, depending on the scope of applicability of the scaling factors. The precision reduction scaling factor and the precision restoration scaling factor may be stored as different parameters with different values. The precision reduction scaling factor and the precision restoration scaling factor may also have the same value and be stored as one parameter.

After encoding the precision reduction/restoration scaling factor(s), the process 800 ends. The video encoder 400 may perform the process 800 again for encoding another block of pixels.

Figure 9:
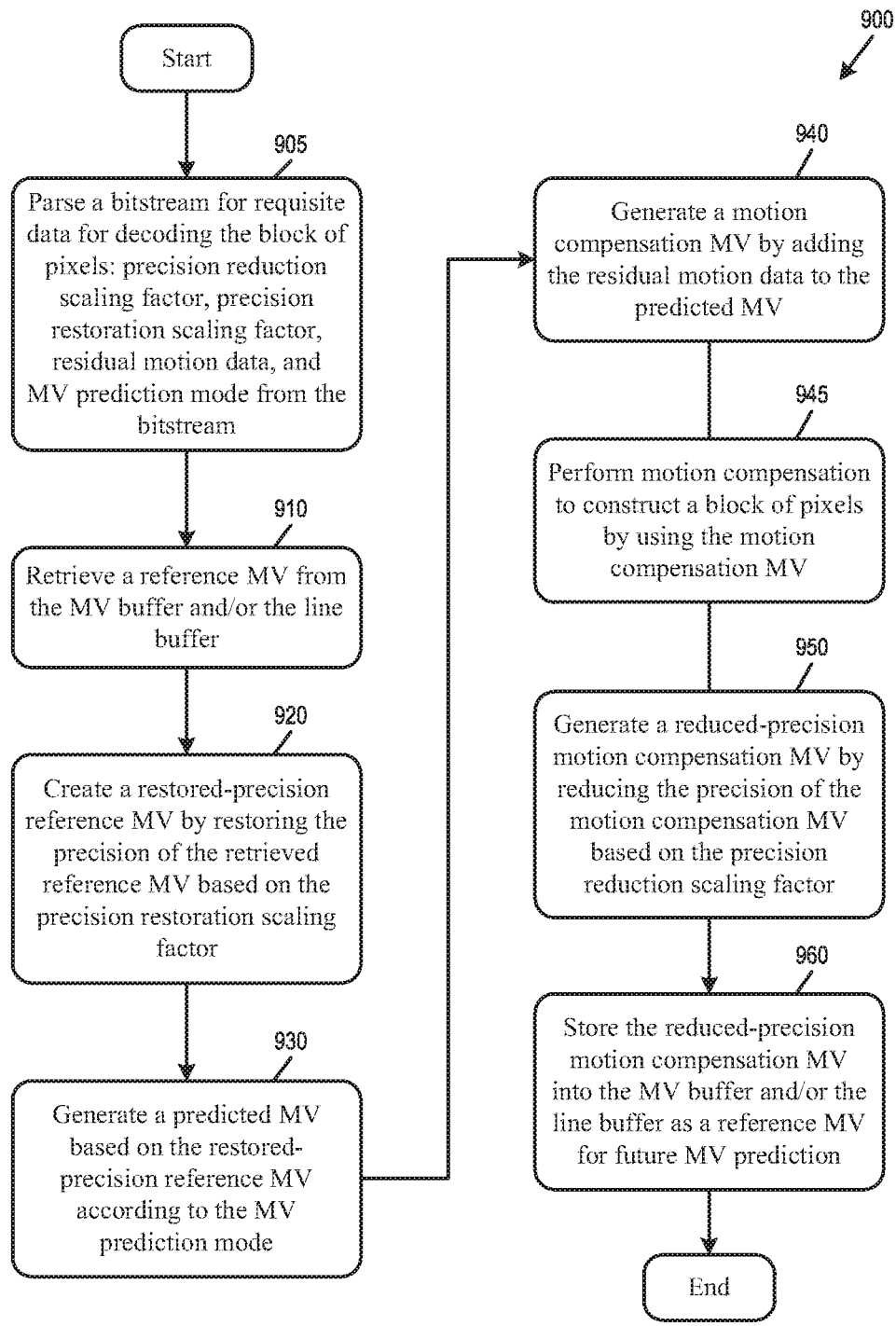
FIG. 9 conceptually illustrates a process for decoding a block of pixels by MV prediction based on reference MVs with reduced precision/resolution in accordance with the present disclosure.

FIG. 9 conceptually illustrates a process 900 for decoding a block of pixels by MV prediction based on reference MVs with reduced precision/resolution. The requisite data for decoding the block of pixels is encoded in a bitstream. In some embodiments, one or more processing units (e.g., processor(s)) of a computing device implementing the video decoder 500 may perform the process 900. In some embodiments, an electronic apparatus having one or more ICs that implement the video decoder 500 may perform the process 900.

The process 900 starts when the video decoder 500 parses (at step 905) the bitstream to extract requisite data for decoding the block pixels, including precision reduction scaling factor, precision restoration scaling factor, residual motion data, MV prediction mode, and transform data. The precision reduction scaling factor and the precision restoration scaling factor may be encoded as parameters in VPS, SPS, PPS, or slice headers. The precision reduction scaling factor and the precision restoration scaling factor may be stored as two different parameters or as one parameter.

The video decoder 500 retrieves (at step 910) a reference MV from the MV buffer or the line buffer. The reference MV is a motion compensation MV for a decoding a pixel block in a previous frame or the current frame. The precision of the reference MV may also be reduced prior to storage in the MV buffer and/or the line buffer.

The video decoder 500 creates (at step 920) a restored-precision reference MV by restoring the precision of the retrieved reference MV based on the precision restoration scaling factor (e.g., up-shifting the reference MV by "d_restore" bit positions). The precision restoration operation is described by reference to precision restoration operation 220 of FIG. 2 (e.g., according to Eqs. (2) and (5).)

The video decoder 500 then generates (at step 930) a predicted MV based on the restored-precision reference MV according to the MV prediction mode, which can be spatial MV prediction or temporal MV prediction (e.g., by scaling the restored-precision reference MV using the temporal positions of the reference frame and the current frame.)

The video decoder 500 generates (at step 940) a motion compensation MV by adding the residual motion data to the predicted MV. The video decoder 500 then performs (at step 945) motion compensation to construct a block of pixels by using the motion compensation MV.

The video decoder 500 generates (at step 950) a reduced-precision motion compensation MV by reducing the precision of the motion compensation MV based on the precision reduction scaling factor (e.g., down-shifting the MV according to "d_reduce"). The precision reduction operation is described by reference to precision reduction operation 210 of FIG. 2 (e.g., Eq. (1), (3), (4).) In some embodiments, the video decoder 500 may generate multiple motion compensation MVs for the block of pixels, but only one MV of the block is selected for storage as reference MV in order to sub-sample the MV field. In these instances, only the selected MV of the block go through the step 950 and is stored in the MV buffer or the line buffer as a reference MV.

The video decoder 500 then stores (at step 960) the reduced-precision motion compensation MV into the MV buffer and/or the line buffer as a reference MV for future MV prediction. The process 900 then ends. The video decoder 500 may perform the process 900 again for decoding another block of pixels.

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 10:
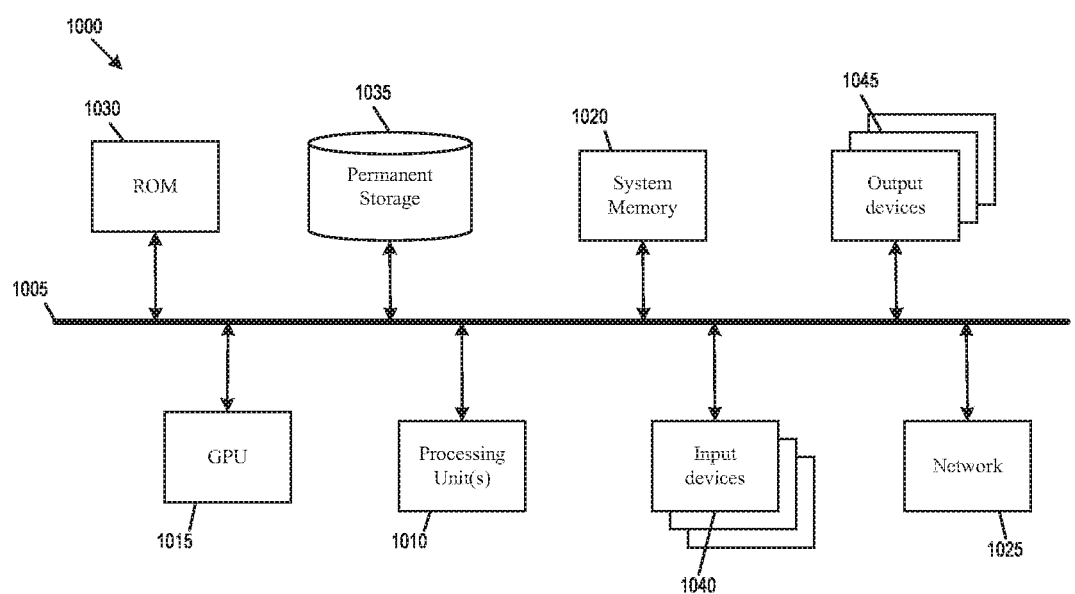
FIG. 10 conceptually illustrates an electronic system in which some embodiments of the present disclosure may be implemented.

FIG. 10 conceptually illustrates an electronic system 1000 with which some embodiments of the present disclosure are implemented. The electronic system 1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1000 includes a bus 1005, processing unit(s) 1010, a graphics-processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the GPU 1015, the read-only memory 1030, the system memory 1020, and the permanent storage device 1035.

From these various memory units, the processing unit(s) 1010 retrieves instructions to execute and data to process in order to execute the processes of the present disclosure. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the present disclosure use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, processes in accordance with the present disclosure are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alpha-numeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 8 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method comprising:
    generating a motion compensation motion vector (MV) to encode or decode a block of pixels; and
    creating a reduced-precision MV by reducing a precision of the generated MV based on a precision reduction scaling factor;
    storing the reduced-precision MV in a MV buffer as a reference MV;
    retrieving the reference MV from the MV buffer;
    creating a restored-precision reference MV by restoring a precision of the retrieved reference MV according to a precision restoration scaling factor; and
    computing a predicted MV based on the restored-precision reference MV and a MV prediction mode.
2. The method of claim 1 further comprising encoding the precision reduction scaling factor as a parameter in a picture parameter set or a sequence parameter set of a bitstream.
3. The method of claim 1 further comprising
    computing a residual motion data based on a difference between the predicted MV and the generated MV; and
    encoding the precision reduction scaling factor, the residual motion data, and the MV prediction mode into a bitstream.
4. The method of claim 3 further comprising encoding the precision restoration scaling factor into the bitstream.
5. The method of claim 3 further comprising encoding the precision reduction scaling factor as a parameter in a slice header of a bitstream.
6. The method of claim 1 further comprising:
    parsing a bitstream to extract the precision reduction scaling factor and a residual motion data,
    wherein generating the motion compensation MV comprises adding the residual motion data with the predicted MV.
7. The method of claim 1, wherein computing the predicted MV comprises performing either or both of temporal MV prediction and spatial MV prediction.
8. The method of claim 1, further comprising selecting one of a plurality of MVs generated for the block of pixels and storing the selected MV in the MV buffer.
9. The method of claim 1, wherein creating the reduced-precision MV comprises rounding up the reduced-precision MV.
10. The method of claim 1, wherein creating the reduced-precision MV comprises initially reducing the precision of the motion compensation MV for spatial MV prediction and then further reducing the precision of the motion compensation MV for storage at the MV buffer.
11. An electronic apparatus comprising:
    a motion compensation circuit capable of using a motion compensation motion vector (MV) to construct a pixel block;
    a precision reduction circuit capable of reducing a precision of the motion compensation MV based on a precision reduction scaling factor to create a reduced-precision motion compensation MV;
    a MV buffer capable of storing the reduced-precision motion compensation MV as one of a plurality of reference MVs;
    a precision restoration circuit capable of receiving a reference MV from the MV buffer, the precision restoration circuit also capable of restoring a precision of the received reference MV according to a precision restoration scaling factor to create a restored-precision reference MV; and
    a MV predicting circuit capable of computing a predicted MV based on the restored-precision reference MV.
12. The electronic apparatus of claim 11 further comprising:
    a motion estimation circuit capable of producing a motion compensation motion vector (MV) for constructing a pixel block; and
    an entropy encoder circuit capable of encoding residual motion data and the precision reduction scaling factor into a bitstream, the residual motion data being a difference between the predicted MV and the restored-precision reference MV.
13. The electronic apparatus of claim 12, wherein the precision reduction scaling factor is encoded as a parameter in a slice header of the bitstream.
14. The electronic apparatus of claim 12, wherein the precision reduction scaling factor is encoded as a parameter in a picture parameter set or a sequence parameter set of the bitstream.
15. The electronic apparatus of claim 11 further comprising:
    a parser circuit capable of parsing a bitstream to extract a residual motion data for a pixel block and a precision reduction scaling factor; and
    wherein the motion compensation MV is computed by adding the residual motion data with the predicted MV.
16. The electronic apparatus of claim 15, wherein the precision reduction scaling factor is encoded as a parameter in a slice header of the bitstream.
17. The electronic apparatus of claim 15, wherein the precision reduction scaling factor is encoded as a parameter in a picture parameter set or a sequence parameter set of the bitstream.

18. The electronic apparatus of claim 11, wherein the MV predicting circuit is capable of computing the predicted MV by either or both of temporal MV prediction and spatial MV prediction.

19. The electronic apparatus of claim 11, wherein the precision reduction circuit rounds up the reduced-precision motion compensation MV.

20. The electronic apparatus of claim 11, wherein the precision reduction circuit reduces the precision of the motion compensation MV for spatial MV prediction and then further reduces the precision of the motion compensation MV for storage at the MV buffer.

* * * * *